(12) United States Patent  
Marshall

(10) Patent No.: US 8,347,824 B2  
(45) Date of Patent: Jan. 8, 2013

(54) COMBINATION RETRACTABLE LEASH ASSEMBLY AND WEARABLE LOCKET FOR COMPANION PET

(76) Inventor: David Christopher Marshall, Aurora, CO (US)

( * ) Notice: Subject to any disclaimer, the term of this patent is extended or adjusted under 35 U.S.C. 154(b) by 113 days.

(21) Appl. No.: 12/823,059

(22) Filed: Jun. 24, 2010

(65) Prior Publication Data

US 2011/0315090 A1    Dec. 29, 2011

(51) Int. Cl.  
*A01K 27/00*    (2006.01)

(52) U.S. Cl. .......................... 119/794; 119/796

(58) Field of Classification Search .................. 119/781, 119/795, 796, 797, 769, 772, 792, 793, 794; 224/184, 254  
See application file for complete search history.

(56) References Cited

U.S. PATENT DOCUMENTS

| | | | |
|---|---|---|---|
| 870,784 | A | 11/1907 | Huff |
| D124,073 | S | 12/1940 | Gottlieb |
| 2,799,245 | A | 7/1957 | Ruggiero et al. |
| 2,817,482 | A | 12/1957 | Ruggiero et al. |
| 2,833,250 | A | 5/1958 | Beebe |
| 2,889,807 | A | 6/1959 | Beebe |
| 3,198,175 | A | 8/1965 | Dean |
| 3,250,253 | A * | 5/1966 | Galin ............................ 119/794 |
| 3,477,410 | A | 11/1969 | Lettieri |
| D216,897 | S | 3/1970 | Meath |
| 3,776,198 | A | 12/1973 | Gehrke |
| 4,018,189 | A | 4/1977 | Umphries et al. |
| 4,165,713 | A | 8/1979 | Brawner et al. |
| 4,197,817 | A * | 4/1980 | Crutchfield ................... 119/794 |
| 4,202,510 | A | 5/1980 | Stanish |
| 4,328,766 | A | 5/1982 | Deibert |
| 4,328,767 | A | 5/1982 | Peterson |
| D269,301 | S | 6/1983 | Deibert |
| 4,748,937 | A | 6/1988 | Musetti |
| D298,579 | S | 11/1988 | Brummett |
| 4,887,551 | A | 12/1989 | Musetti |
| 4,964,370 | A | 10/1990 | Peterson |
| 4,977,860 | A * | 12/1990 | Harwell ........................ 119/794 |
| D337,866 | S | 7/1993 | Wiens |
| 5,233,942 | A | 8/1993 | Cooper et al. |

(Continued)

FOREIGN PATENT DOCUMENTS

EP    0278657    8/1988

(Continued)

OTHER PUBLICATIONS

"Quick Control Collar XL Pink," Arcata Pet Supplies website at http://www.arcatapet.com/item.cfm?cat=11387, printed Feb. 19, 2010, 1 page.

(Continued)

*Primary Examiner* — Rob Swiatek  
*Assistant Examiner* — Ebony Evans  
(74) *Attorney, Agent, or Firm* — Sheridan Ross P.C.

(57) ABSTRACT

A retractable leash assembly that may be selectively carried by a user while attached to the collar or other wearable item on a companion pet and carried by the pet while not in use. The leash assembly may be connected to more than one location along the collar or other wearable item for securing the leash assembly to the companion pet. The leash assembly comprises a braking mechanism for stopping the movement of the leash in a preferred embodiment. In a preferred embodiment, the retractable leash assembly provides a full-length leash and weighs less than about 85 g.

29 Claims, 10 Drawing Sheets

U.S. PATENT DOCUMENTS

| | | | |
|---|---|---|---|
| 5,377,626 A | 1/1995 | Kilsby et al. | |
| 5,595,143 A | 1/1997 | Alberti | |
| 5,816,198 A | 10/1998 | Peterson | |
| 5,873,328 A | 2/1999 | Campbell | |
| 5,938,137 A * | 8/1999 | Poulson | 242/379.2 |
| 6,205,956 B1 | 3/2001 | Dickie et al. | |
| 6,419,175 B1 * | 7/2002 | Rankin, VI | 242/373 |
| 6,481,382 B2 | 11/2002 | Cohn | |
| 6,581,547 B1 | 6/2003 | Austin | |
| D484,650 S | 12/2003 | Meath | |
| 6,792,893 B1 | 9/2004 | Quintero et al. | |
| 6,912,975 B1 | 7/2005 | Balan | |
| 7,017,527 B2 | 3/2006 | Price | |
| D519,246 S | 4/2006 | Plewa | |
| D523,188 S | 6/2006 | Lord | |
| D530,046 S | 10/2006 | Lord | |
| 7,150,247 B2 | 12/2006 | Eulette et al. | |
| 7,174,857 B2 | 2/2007 | Lord | |
| 7,281,495 B2 | 10/2007 | Wagner | |
| D573,314 S | 7/2008 | Plewa | |
| 7,461,615 B2 | 12/2008 | Albright | |
| D587,861 S | 3/2009 | Miller | |
| 7,610,880 B2 | 11/2009 | Lord | |
| D610,752 S | 2/2010 | Roediger | |
| D621,562 S | 8/2010 | Marshall | |
| 2004/0154556 A1 | 8/2004 | Masterson et al. | |
| 2005/0112521 A1 | 5/2005 | Harvey et al. | |
| 2006/0137625 A1 | 6/2006 | Conte | |
| 2006/0144343 A1 | 7/2006 | Price | |
| 2006/0288960 A1 | 12/2006 | Harrison | |
| 2007/0039560 A1 | 2/2007 | Smith | |
| 2008/0017134 A1 | 1/2008 | Robley et al. | |
| 2008/0163830 A1 | 7/2008 | Dagnon | |
| 2009/0159014 A1 | 6/2009 | Olenick | |
| 2009/0255485 A1 | 10/2009 | Dickie et al. | |
| 2009/0255486 A1 | 10/2009 | Thompson et al. | |
| 2010/0037832 A1 | 2/2010 | Smith | |

FOREIGN PATENT DOCUMENTS

| | | |
|---|---|---|
| EP | 0280399 | 8/1988 |
| EP | 0354796 | 2/1990 |
| EP | 0356083 | 2/1990 |
| EP | 0383561 | 2/1990 |
| EP | 0427355 | 5/1991 |
| EP | 0477993 | 4/1992 |
| EP | 0551215 | 7/1993 |
| EP | 0912083 | 5/1999 |
| EP | 0914762 | 5/1999 |
| EP | 0941657 | 5/1999 |
| EP | 0934689 | 8/1999 |
| EP | 0958726 | 11/1999 |
| EP | 0984676 | 3/2000 |
| EP | 0997063 | 5/2000 |
| EP | 0997064 | 5/2000 |
| EP | 0998839 | 5/2000 |
| EP | 0998840 | 5/2000 |
| EP | 0998841 | 5/2000 |
| EP | 0998842 | 5/2000 |
| EP | 1052889 | 11/2000 |
| EP | 1183929 | 3/2002 |
| EP | 1213428 | 6/2002 |
| EP | 1232688 | 8/2002 |
| EP | 1237799 | 9/2002 |
| EP | 1266555 | 12/2002 |
| EP | 1135935 | 8/2004 |
| EP | 1495675 | 1/2005 |
| EP | 1611959 | 1/2006 |
| EP | 1684660 | 8/2006 |
| EP | 1972745 | 3/2007 |
| EP | 1808563 | 7/2007 |
| EP | 1818488 | 8/2007 |
| EP | 1878341 | 1/2008 |
| EP | 1892360 | 2/2008 |
| EP | 1923205 | 5/2008 |
| EP | 1972193 | 9/2008 |
| EP | 1990304 | 11/2008 |
| EP | 2055661 | 5/2009 |
| GB | 2114864 | 9/1983 |
| WO | WO 98/00003 | 1/1998 |
| WO | WO 98/39960 | 9/1998 |
| WO | WO 99/39562 | 8/1999 |
| WO | WO 00/08397 | 2/2000 |
| WO | WO 00/30362 | 5/2000 |
| WO | WO 01/44071 | 6/2001 |
| WO | WO 2004/008985 | 1/2004 |
| WO | WO 2006/002497 | 1/2006 |
| WO | WO 2008/077613 | 7/2008 |
| WO | WO 2009/134353 | 11/2009 |

OTHER PUBLICATIONS

"The World's First Retractable Designer Leash," InvisaLeash, LLC website at http://invisaleash.com/, printed May 13, 2010, 1 page.

"Dog Lead Flexi Click," zooplus.ie website at http://www.zooplus.ie/shop/dogs/dog_collars_dog_leads/retractable_leads/flexi_special/162924#more, printed May 13, 2010, 2 pages.

"Click Die Leine, die der Hund selber trägt," German flexi website at http://www.flexi.de/flexi-de/produkte/neuheiten-click.php?navanchor=3410078, printed May 13, 2010, 1 page.

International Search Report for International (PCT) Patent Application No. PCT/US2010/049939, mailed Nov. 9, 2010.

Written Opinion for International (PCT) Patent Application No. PCT/US2010/049939, mailed Nov. 9, 2010.

* cited by examiner

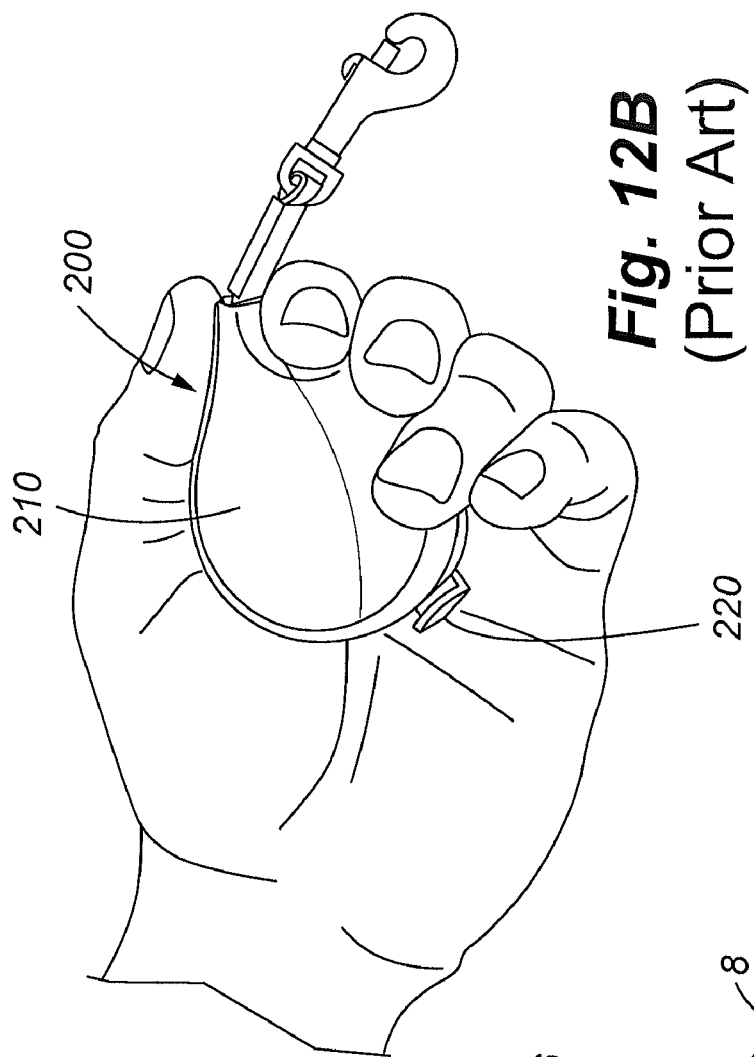
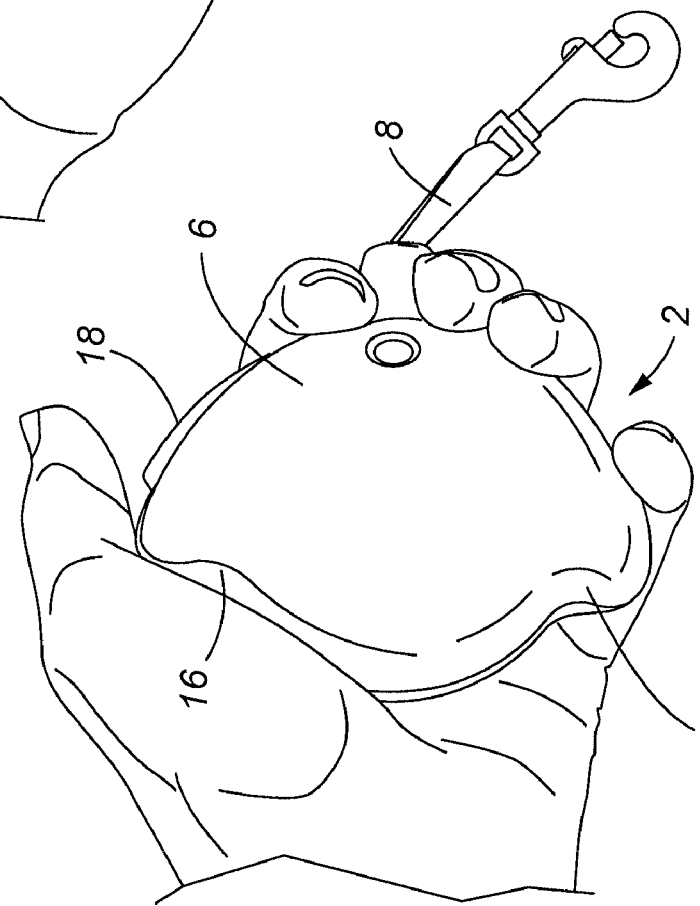

COMBINATION RETRACTABLE LEASH ASSEMBLY AND WEARABLE LOCKET FOR COMPANION PET

FIELD OF THE INVENTION

The present disclosure is related to devices for restraining a companion pet, such as a dog, and more specifically to a combination leash and locket assembly that may be selectively carried by a user while attached to the collar or other wearable item on the pet or carried by the pet while not in use.

BACKGROUND OF THE INVENTION

Leashes and other restraints or leads are common for use with a companion pet, but are frequently unused by the pets owner due to convenience and other reasons described herein. As leash laws in most communities are becoming more stringent and more routinely enforced, however, it is becoming less desirable to permit a companion pet (particularly a dog) to roam freely and unleashed. As a consequence, walking such pets while they are confined on leashes is becoming increasingly prevalent.

Conventionally, the leash and collar/harness utilized with companion pets are separate devices which are only capable of being removably attached to each other. Although the conventional leash and collar combination works well with many animals and in a number of circumstances, it may be inconvenient to use the separate devices in certain circumstances. For example, animal owners frequently do not desire to carry an additional object, thereby limiting their freedom of movement. In the absence of a leash, however, animal owners may be required to bend over and grasp directly onto the animal's collar in order to control the animal.

One inconvenience that is commonly experienced when walking a pet is the necessity of first obtaining the leash, collar or harness, and securing it to the animal before the walk can commence. Another inconvenience occurs when walking in an area where the leash is not required, such as in open space or at a dog park, and removing the leash from the pet while the pet is still restrained. When not in use, the owner is required to carry the leash, which can be a further inconvenience. In this manner, the leash may also become lost or misplaced during or before the walk, or the constant securing and unsecuring of the leash may cause problems when the user attempts to restrain the animal.

When not in use, the leash may become tangled, and a retractable type leash may become jammed. Impatient pets do not typically respond well to delay, and this waiting may lead to overanxious pet behavior such as jumping, whining, etc., and further increase the effort of attaching the leash to the pet's collar. If the leash cannot be quickly located, a pet owner may even resort to using items such as ropes or cords as a restraining device, which are typically not designed for use with pets.

Recent improvements to leashes include retractable leash assemblies that often have bulky, spring-loaded mechanisms housed inside. There are also leash assemblies available that provide a spring loaded leash in a hand-held assembly, which is retractable within the housing of the leash, and that can be carried by the user of the leash assembly. These known hand-held leash assemblies are typically too large and heavy for the animal to carry by itself, and are typically bulky and cumbersome even for carrying by the user, often causing discomfort to the user while attempting to control the animal by only a slim handle portion of the leash housing. As the spring-loaded assemblies contain several moving parts, each of which is subject to damage due to misuse or wear and tear, these types of leash assemblies also tend to break or become damaged during use. Therefore, the lifespan of the spring-loaded assembly is often cut short, requires maintenance, etc., as a result of the multiplicity of moving parts. Finally, these types of leash assemblies are complex and expensive to manufacture.

More recent developments in leash technologies include the introduction of wearable leash assemblies that allow an animal to carry the leash while not in use by the owner of the animal, including "emergency leads." However, these prior art leads are lacking in several critical respects. First, the assemblies are not easily attached to the collar of the animal, or are specific to one size or breed of animal alone, and may eliminate the option of completely removing the leash assembly when the animal is indoors or otherwise is not in need of restraint. Second, these assemblies provide inadequate handles for restraining an animal, and often provide leash lengths that are too short for most animals, including larger breeds of dogs, who typically enjoy walking a distance away from their owner. Third, given the relatively small size of these typical leash assemblies, the prior art devices typically do not provide a braking means for restraining the animal at a distance other than the full length of the leash. And fourth, the leash assemblies do not typically provide identification means in the event the animal and the owner become separated. Other problems with these prior art devices include numerous moving parts, leash materials that can easily break or become tangled during use, etc.

Certain non-emergency or "full service" leashes also include assemblies that may be worn around the collar of the animal when it is not in use, but removed if desired by the user. Several of these leash assemblies are described in the Summary of the Invention below. One common problem with these prior art assemblies is that they are too heavy or cumbersome to be worn by most companion pets when the pet is moving at even a steady walk, let alone running or moving freely and not restrained by the leash. For example, the prior art includes a number of bulky and heavy leash assemblies which dangle from the animals' collar in such a way as to interfere with the movement of the animal, including swinging and striking the animal while it is in movement. In addition, many of these prior art leash assemblies have handles that are either too small or provide insufficient surface area for grasping and controlling the animal when the leash is in use, or have no way of identifying the animal if the animal becomes lost or runs away from its owner. These leashes are also often affixed to the collar or harness worn by the animal in such a manner that makes it difficult to remove the leash assembly when it is no longer desired.

Another problem with prior art leashes and leads is experienced when the dog or companion pet wants to go into the water, such as a lake, river, pool, etc. Prior art leashes are too bulky and cumbersome to move around in the water while being worn by the animal, and may become detached from the collar and snag on loose branches or rocks at the bottom of the lake or river, thereby creating a hazard to the animal. Thus, it is desirable to provide a leash assembly that is light weight and compact so that it may be worn by the animal and carried securely on the collar while the animal is in the water. Furthermore, prior art leashes do not provide means for draining water from the leash, should water inadvertently enter through the opening in the casing for the leash or cord, thereby adding to the weight of the leash assembly. Thus it is also desirable to provide one or more drain holes so that water is allowed to drain out of the leash assembly once the animal has left the water.

In view of the foregoing, an object of the present disclosure is to provide an improved leash for dogs or other companion pets and like animals, which selectively attaches to a ring or loop by way of a buckle, and which remains with the animal at all times so that it is convenient and ready for immediate use. It is another object of the invention to provide a leash assembly that attaches to the collar or harness worn by the pet at a primary location and at a second location other than the primary location for ease of carrying of the leash assembly by the pet, and to accommodate for a greater freedom of movement of the owner and pet. It is yet another object of the present disclosure to provide a full length leash that is housed within a compact and wearable assembly, which in total weighs less than about 125 grams, and preferably weighs less than about 85 grams. Other objects of the present invention are provided in the Summary of the Invention.

SUMMARY OF THE INVENTION

The present invention, according to varying embodiments disclosed herein, provides a solution to the problems associated with prior art leashes, as well as other problems identified herein. Embodiments described herein include a selectively wearable, ergonomic, full-length leash, which is retractable within a relatively small and portable casing and is lighter in weight than known leash assemblies, and which may be worn by the animal by at least two points of attachment to the animal's collar. These and other aspects of the invention will become apparent from a review of the preferred embodiments and the description of the drawing figures herein.

The retractable leash assembly of the present disclosure solves particular problems associated with prior art animal restraints. For example, see U.S. Pat. Nos. 3,776,198, 4,977,860, 6,481,382, 7,017,527, and U.S. Publication Nos. 2006/0042562 and 2008/0017134, which are incorporated by reference herein in their entireties, and provide a general description of the prior art related to the present disclosure. A brief description of the shortcomings associated with each of these references is provided in this Summary.

U.S. Pat. No. 6,481,382 issued to Cohn, for example, provides only a very short (30") elastomeric cord which is designed to retract within a collar worn around the neck of the animal. The storage means for this cord limits the length and type of material from which the leash may be constructed, which in turn limits the device of Cohn to use with only relatively small animals. Additionally, the handle disclosed in Cohn is insufficient for grasping and controlling the animal, and furthermore this device discloses no means of providing identification of the animal or its owner should the owner inadvertently lose hold on the small cord attached to the animal.

U.S. Pub. No. 2006/0042562 discloses another type of assembly wherein the leash is simply wrapped around and fastened to the collar when not in use. The device requires significant manipulation between use and non-use, as the owner is required to maintain the animal in a near motionless state while wrapping the leash multiple times around the animal's neck. The device also limits the practical length of the leash in relation to the size of the animal's collar. Finally, the reference fails to disclose a means for selectively stopping the retraction of the leash once it is unfastened from the collar.

Other references disclose identification means included on a conventional leash assembly. For example, U.S. Pat. No. 3,776,198 to Gehrke provides a retractable leash assembly comprising a raised portion for imprinting thereon identification information associated with the animal, but discloses only a chain leash which is subject to breaking, loosening and tangling during use. Furthermore, the leash of Gehrke is retractable within a relatively small, circular handle, and is not selectively removable from the animal without removing the entire leash/collar assembly, thereby limiting the user's ability to selectively use or store the leash assembly on the animal. U.S. Patent Application Publication No. 2008/0017134, published to Robley et al., discloses a similar device to that disclosed in Gehrke. However, the Robley device is not easily detached from the animal without significant modification to the leash/collar assembly. Furthermore, the leash itself is comprised of a thin cable, which may not provide sufficient strength to restrain larger animals.

U.S. Pat. No. 7,017,527 issued to Price and U.S. Pat. No. 4,977,860 issued to Harwell both provide spring-biased retractable leash mechanisms. While perhaps easier to use than other prior art retractable leashes, U.S. Pat. No. 7,017,527 and U.S. Pat. No. 4,977,860 both have numerous components that are unnecessary to the basic operation of the device, which further increase the weight and size of the leash assemblies. The devices of Price and Harwell also do not incorporate a braking mechanism, and are rigidly fixed to the pet's collar, and therefore suffer from the same problems associated with other assemblies, including the previously discussed Gehrke and Robley assemblies.

U.S. Pat. No. 7,150,247 to Eulette et al. discloses a retractable dog leash system that provides an attachable leash which may be worn by an animal while attached to its collar that is relatively small, and partially eliminates discomfort due to weight and bulkiness. The problem with Eulette et al. is that a majority of the weight of the device is born by the animal when the leash is extended and in use, and that there is no accommodation for the osculating movement of the animal when it is wearing this leash assembly. In addition, Eulette et al. comprises a clip, which may easily become disengaged from the collar of an animal, thereby creating additional safety concerns. It is also noted that Eulette et al. does not disclose any means of identifying the animal should it become separated from its owner.

The device of the present disclosure solves these and other problems associated with the prior art by providing a retractable leash assembly that may be selectively carried by a user while attached to the collar or other wearable item on a pet or carried entirely by the pet while not in use by the owner. According to various embodiments described herein, the retractable leash assembly is comprised of fewer components and smaller components that those described in the prior art. In one embodiment, the retractable leash assembly further comprises braking means for selectively stopping the retraction of the leash from the leash assembly.

In one embodiment, the retractable leash assembly, which includes a full length leash component, weighs less than other leash assemblies, in many instances by more than 100 to 250 grams. According to varying embodiments disclosed herein, the leash assembly is significantly lighter in weight than other wearable leash assemblies that may be carried by the animal. In one embodiment, the leash assembly, including the handle, leash, buckle, and all components within the casing weighs between about 75 g and about 140 g. According to a more preferred embodiment, the leash assembly weighs between about 80 g and about 125 g. According to a most preferred embodiment, the leash assembly weighs about 80 g. The weight of the leash assembly may vary according to the size or breed of animal to be used with the leash assembly, the total amount of leash to be stored within the casing, the presence or absence of the braking assembly, etc.

In one particular aspect or embodiment of the present invention, a leash assembly is provided which generally comprises a leash, which is operatively associated with a rotational spool, and further comprises a buckle affixed to one distal end of the leash. The leash assembly also comprises a handle for retractably storing the leash and the rotational spool, the handle further comprising a receiving member, and an attachment member that is secured to a collar worn by an animal, the attachment member comprising an engaging member for engaging the receiving member. According to this particular embodiment, the buckle may be selectively engaged to the collar forming a first connection between the leash assembly and the collar. The engaging member may then be selectively engaged with the receiving member, forming a second connection between the leash assembly and the collar. The leash assembly may further be selectively removed from the collar by disengaging the engaging member from the receiving member without disconnecting the buckle from the collar.

According to another embodiment of the present invention, a retractable leash is provided, which generally comprises a handle configured to be placed in the hand of a user or selectively worn by an animal, a spool mounted to a spindle located within the handle for receiving a leash, a buckle secured to the leash for connecting the leash to a collar worn by an animal, a magnetic receiving member located on or within the handle for receiving a magnetic engaging member having an opposite magnetic polarity as the magnetic receiving member and an attachment member that is secured to a collar worn by an animal, wherein the attachment member comprises a magnetic engaging member for engaging the magnetic receiving member. In this configuration the buckle may be connected to the collar in a first connection, and the magnetic engaging member may be connected to the magnetic receiving member in a second connection such that the leash assembly may be selectively disconnected from the collar by disengaging the magnetic engaging member from the magnetic receiving member without disconnecting the buckle from the collar. Also, the spool of the device is further comprised of a plurality of teeth along the circumference of the spool. The leash assembly further comprises a latching member extending outside the handle and having a first position and a second position, wherein the latching member is coupled with a braking member configured to engage one of the plurality of teeth when the latching member is in the second position, and wherein the spool is not free to rotate when the braking member engages one of the plurality of teeth, thereby preventing the leash from retracting from the handle. When the latching member is in the first position, the braking member disengages from the one of the plurality of teeth thereby permitting the leash to exit or enter the handle, and wherein the latching member, once depressed in its second position, may slide laterally to a third position at least partially engage the handle such that the latching member may not be returned to its first position without first returning the latching member to its second position. Thus, the spool and leash may be permanently locked in a third position by manipulation of the latching member by the user.

These and other features will become apparent after review of the following Detailed Description and accompanying drawing figures and appended claims.

BRIEF DESCRIPTION OF THE DRAWINGS

FIG. 12A is a perspective view of the leash assembly according to a preferred embodiment in the hand of a user; and FIG. 12B is a perspective view of a prior art emergency lead in the hand of a user.

The drawings are not necessarily to scale.

DETAILED DESCRIPTION

As described in detail herein, various embodiments of the present disclosure comprise a leash assembly that is further comprised of a lightweight, small handle for housing a retractable leash, and also comprises identification means which may be conveniently worn about the collar or harness of the a companion pet similar to a dog tag or "locket," but which does not interfere with the free movement of the companion pet when the leash is not in use. Another aspect of the present invention is to provide a leash assembly that may be connected at one point by a first attachment to a collar or harness, such as a buckle, for operating the leash in an extended position, and that also connects by a second attachment point on the collar or harness worn by the animal when the leash assembly may be worn by the animal and when the leash assembly is not in an extended position. Yet another aspect of the present invention is to provide a leash assembly which is smaller and less cumbersome to attach to the collar or harness of an animal, such as a dog. A further aspect of this invention is to provide an ergonomically shaped leash assembly which may be easily grasped and retained by a user for walking and/or restraining larger dogs in excess of 90 lbs. These and other aspects will be apparent after a review of this Description and the appended drawing figures.

According to varying embodiments disclosed herein, it is one aspect of the present disclosure to provide a handle for a leash assembly which is small in size, but which is also comfortable to be held in a single hand of a user, as is typical when walking a dog or other companion pet. It is furthermore one aspect of the present disclosure to provide a handle which is ergonomic to the shape of a user's hand, such that the palm and the fingers may engage opposite sides of the leash assembly handle, and thereby securely grasp the handle while the leash assembly is in use. It is a further aspect of the present disclosure to provide such an ergonomic handle that permits a user to operate the leash assembly in the same manner whether the handle is held in a user's right or left hand. Thus, the symmetry of the handle of the leash assembly according to a preferred embodiment is another beneficial aspect of the present disclosure.

Figure 1:
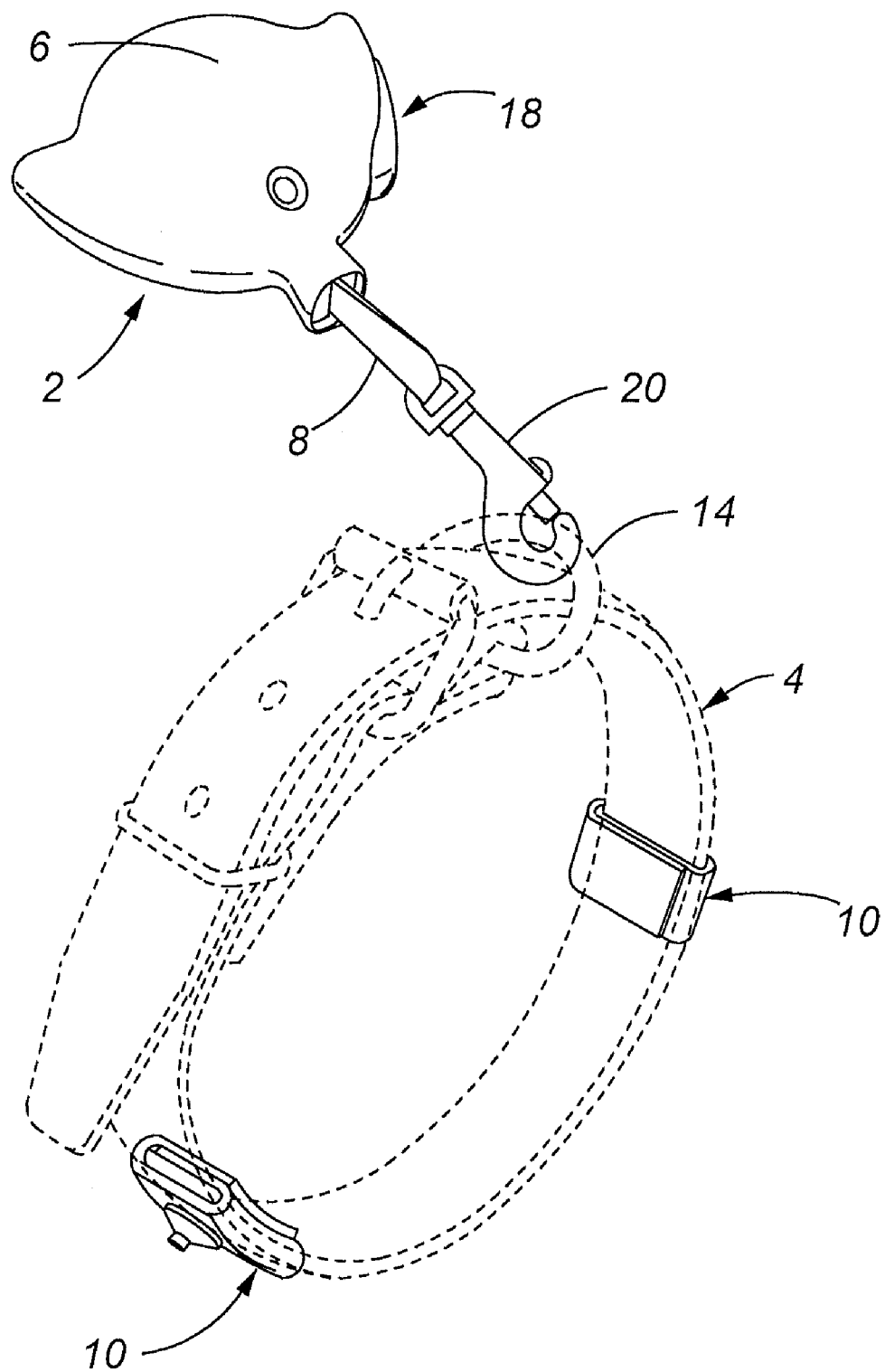
FIG. 1 is a perspective view of the leash assembly shown with a collar for attaching to the neck of a companion pet.

Referring now to the drawings, FIG. 1 shows the leash assembly 2 according to a preferred embodiment of the present disclosure. The leash assembly 2 may be attached to a collar 4, such as one that may be worn by a companion pet, such as a dog. It is expressly provided that other styles and types of collars/harnesses may be used without departing from the novel aspects of the present disclosure. The leash assembly 2 according to this embodiment is generally comprised of the following parts: a handle 6, which may be coupled to a ring or loop 14 on the collar 4 by way of a buckle 20; a leash 8, which is affixed to the handle 6 and may be retracted within the handle 6, and is coupled at one end to the buckle 20; one or more attachment members 10 for securing the handle 6 of the leash assembly 2 at a secondary location (other then the attachment made by the buckle 20) for eliminating undesired movement, jostling, bumping, or bruising of the animal when the leash assembly 2 is being worn by the animal and not in use; and a brake assembly 18 for selectively stopping the movement of the leash 8 relative to the handle 6. According to this embodiment, the attachment means 10 may be located about any area along the collar 4, and may be selectively removable and replaceable at one or more locations. In certain embodiments, more or less than two attachment means 10 may be provided for securing the handle 6 at multiple points about the collar 4 worn by the animal, according to the user's preference, the orientation of the collar 4, the desired location of the leash assembly 2 relative to the attachment means 10, etc.

Figure 2:
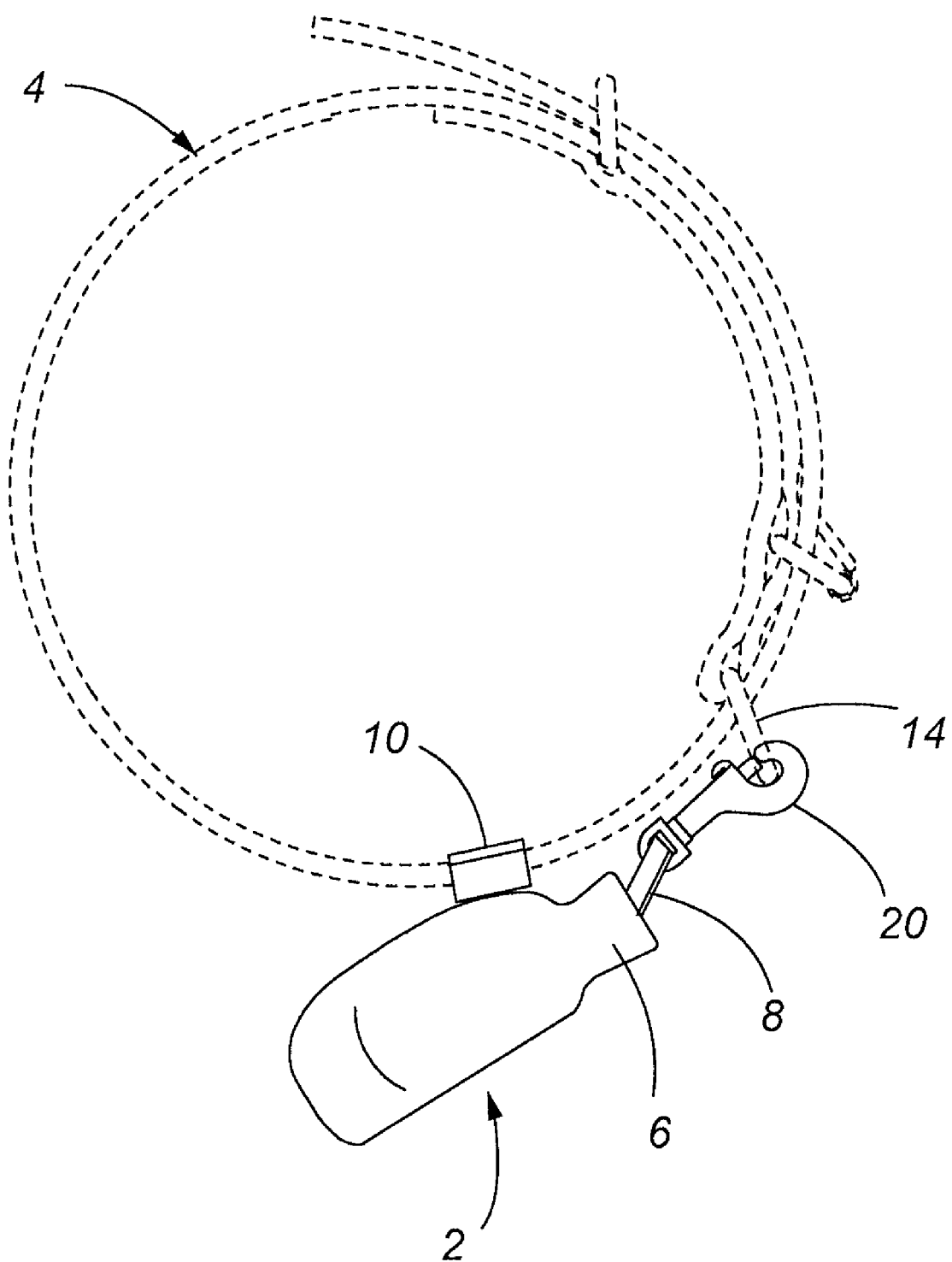
FIG. 2 is an elevation view of the leash assembly according to the embodiment of FIG. 1 shown in a secured position.

Referring now in detail to FIG. 2, the leash assembly 2 is shown in a secured or wearable position of non-use. Here, the attachment means 10 engages with the handle 6 of the leash assembly 2 and holds the handle 6 to the attachment means 10 and thereby the collar 4. In this manner, the handle 6 is not free to dangle or swing from the attachment between the buckle 20 and the loop 14 on the collar 4 worn by the animal, and the animal is relatively free to move at ease without disturbance by the movement of the leash assembly 2 when it is not in use. The connection between the attachment means 10 and the handle 6 is described in greater detail in reference to FIG. 4 below.

Figure 3:
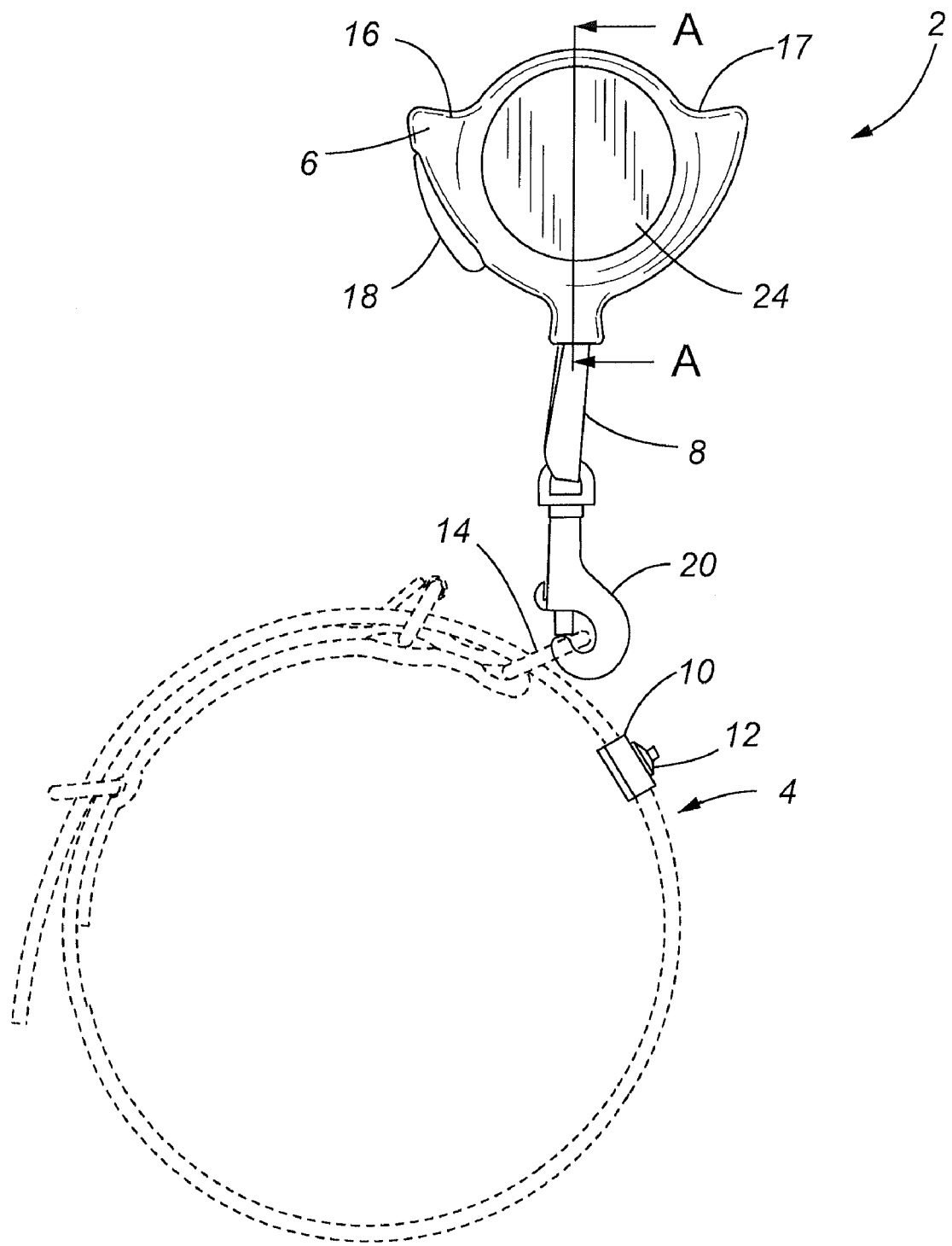
FIG. 3 is another elevation view of the leash assembly according to the embodiment of FIG. 1 shown in an unsecured position.

Referring now in detail to FIG. 3, the leash assembly 2 according to one particular embodiment is shown in an elevation view. In this embodiment, at least one surface of the handle 6 of the leash assembly 2 includes a display 24 for mounting indicia for identifying the animal, the owner of the animal, the address of the owner (or the animal), or other pertinent information relating to the identity of the animal and/or its owner. The display 24 is further described in relation to FIG. 4 below. As shown in FIG. 3, the leash assembly 2 is formed in a generally ergonomic shape, and having a size relative to a user's hand such that it may be firmly placed within the user's palm such that the heel of the user's hand and the base of the user's thumb may engage the generally arcuate surfaces 16, 17 on handle 6, while permitting the user's thumb or one or more fingers to engage the braking assembly 18 for selectively locking or releasing the leash 8 from the handle 6. Further details regarding the braking assembly 18 are provided in relation to the description in FIGS. 4-9 below.

Figure 4:
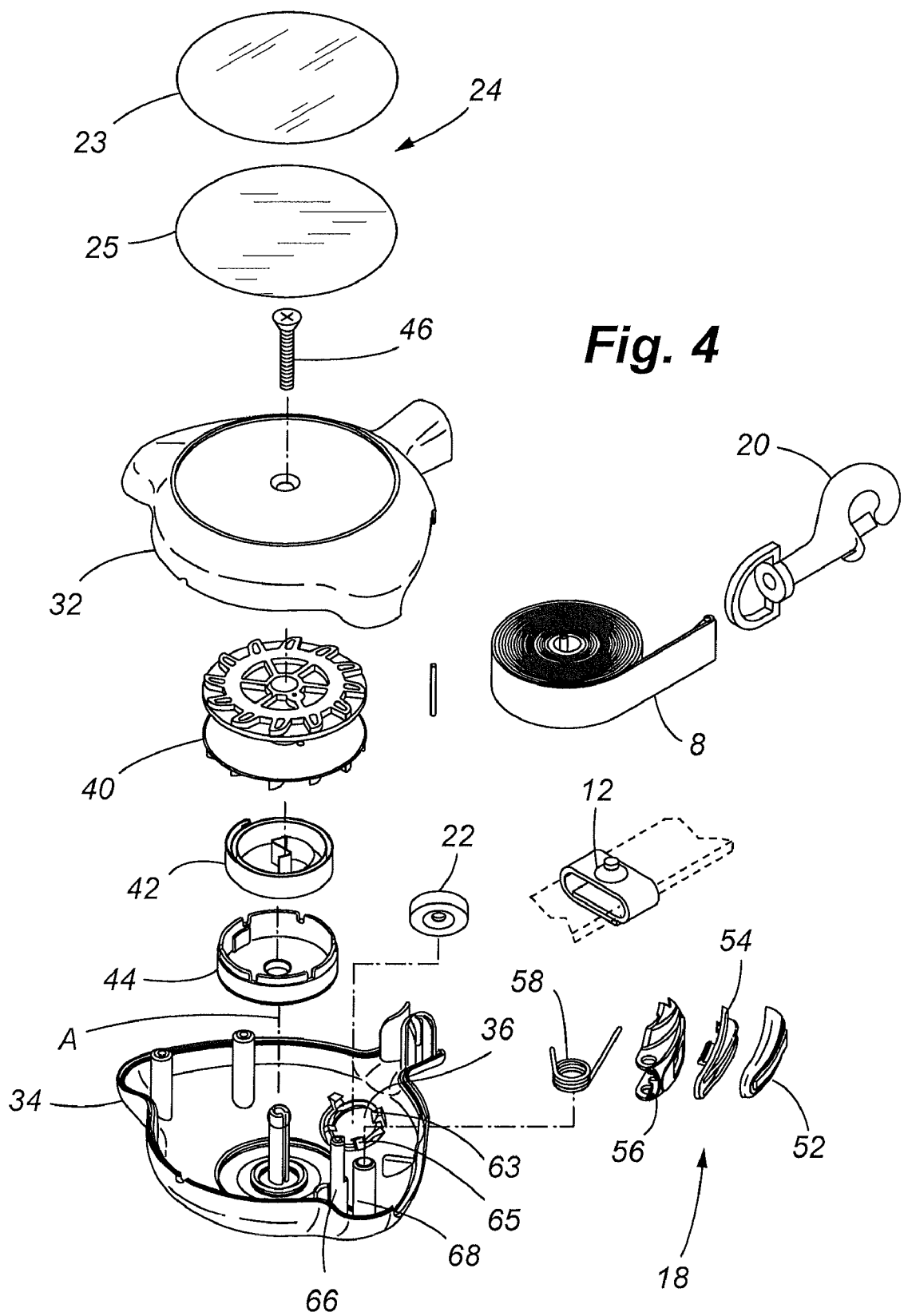
FIG. 4 is a partially exploded view of the leash assembly according to the embodiment of FIG. 1.

Referring now in detail to FIG. 4, the leash assembly 2 according to a preferred embodiment is shown in an exploded view. The handle 6 of the leash assembly 2 is formed generally of a casing 32, 34 preferably comprised of multiple parts. The casing 32, 34 houses a spool 40, which is rotatable about an axis A of the handle 6. The spool 40 is dimensioned and oriented to receive a sufficient length of leash 8, preferably of the type shown in FIG. 4. According to varying embodiments, the leash 8 may be comprised of a variety of materials, including by way of example but not limitation, nylon, nylon mesh, polyester, elastomeric cord, woven cord, leather, or any other material suitable for winding about spool 40 and restraining an animal such as a dog. According to a preferred embodiment, the spool 40 of the leash assembly 2 is designed to accommodate approximately six (6) linear feet of leash material, though more or less could be accommodated depending upon various design reworks.

Referring again to FIG. 4, the leash assembly 2 further comprises a first biasing member 42 and biasing member housing 44 which is described in greater detail herein. The first biasing member 42 and biasing member housing 44 are operatively associated with spool 40 so as to bias the spool 40 in a generally clockwise direction (as shown in FIG. 4) to permit the leash 8 to be retracted from the casing 32, 34 but bias the leash 8 to be wound around the spool 40. One or more fastening members 46 may be provided for securing the spool 40, the first biasing member 42 and the biasing member housing 44 to the casing 32, 34.

The leash assembly further comprises a means for selectively stopping the movement of the leash 8 relative to the spool (i.e., the stop retraction of the leash), which is preferably comprised of a brake assembly 18, second biasing member 58, and a locking assembly 52, 54, 56 as shown in FIG. 4. Further details regarding the stopping means is provided in connection with the descriptions of FIGS. 5-9 below.

According to a preferred embodiment of the present disclosure, the leash assembly 2 further comprises a receiving member 22 for receiving at least one engaging member 12 associated with the attachment means 10, the receiving member 22 inserted in an aperture 36 in casing 34. As shown in FIG. 4, the receiving member is preferably engaged by a plurality of clips 63, 65, which may be used to hold the receiving member in the relative position of the aperture 36. The receiving member 22 is preferably contoured for matingly receiving at least one engaging member 12 of the attachment means 10 shown in FIG. 4. The leash assembly 2 according to this embodiment also comprises at least one surface 25 for displaying indicia relating to the identity of the animal or the animal's owner, and at least one cover 23, which collectively may comprise the display 24. The display comprise a variety of indicia for identifying the animal, the owner of the animal, the address of the owner (or the animal), or other pertinent information relating to the identity of the animal and/or its owner.

Figure 5A:
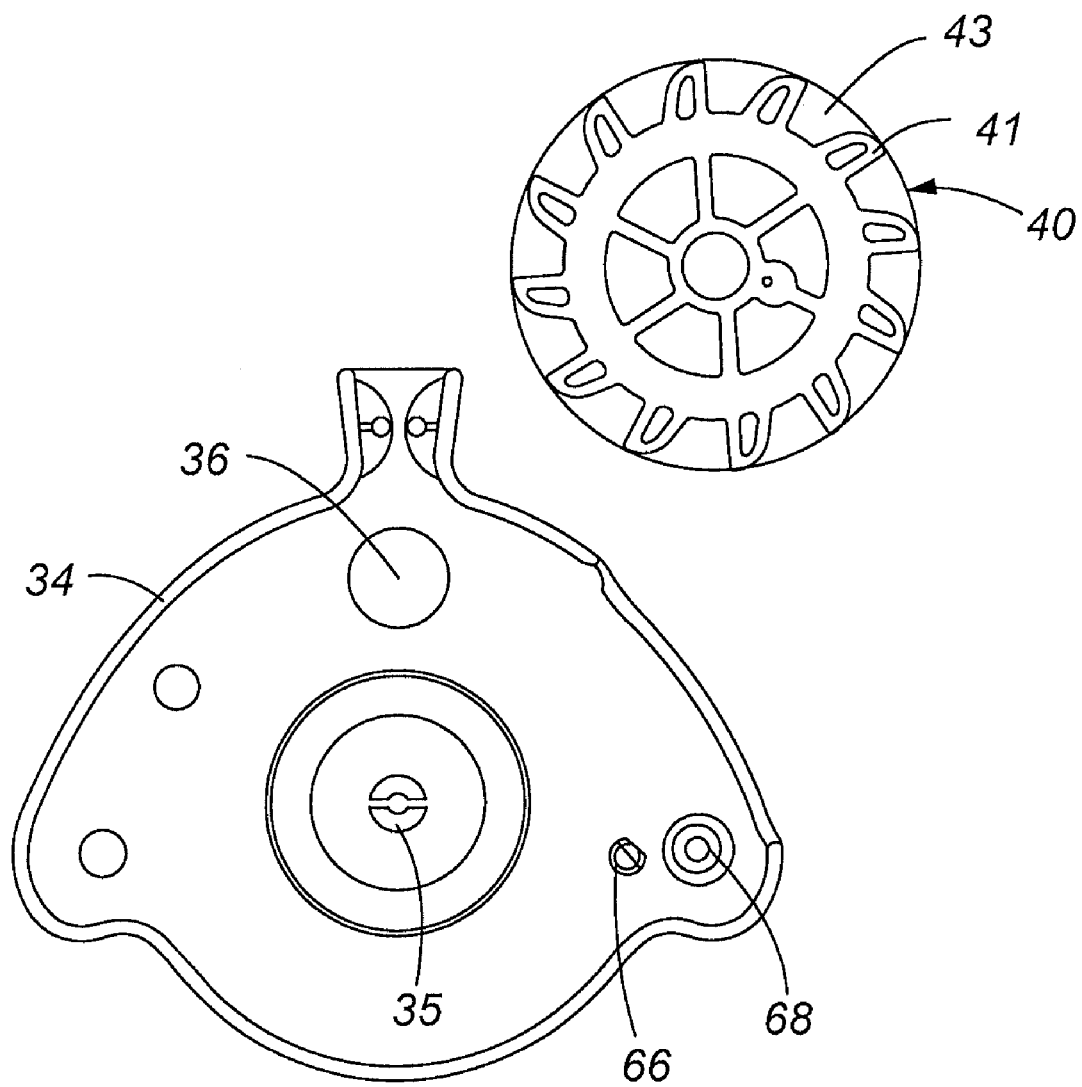
FIG. 5A is a sectional view of the leash assembly according to the embodiment of FIG. 1 showing the spool and casing.
Figure 5B:
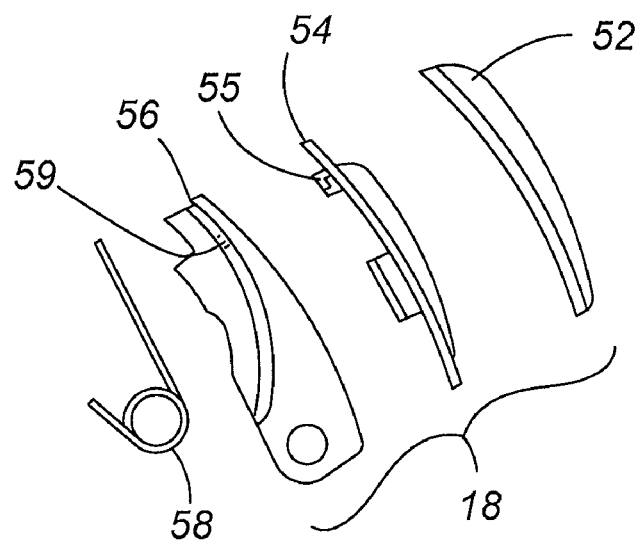
FIG. 5B is an elevation view of the locking assembly.
Figure 5C:
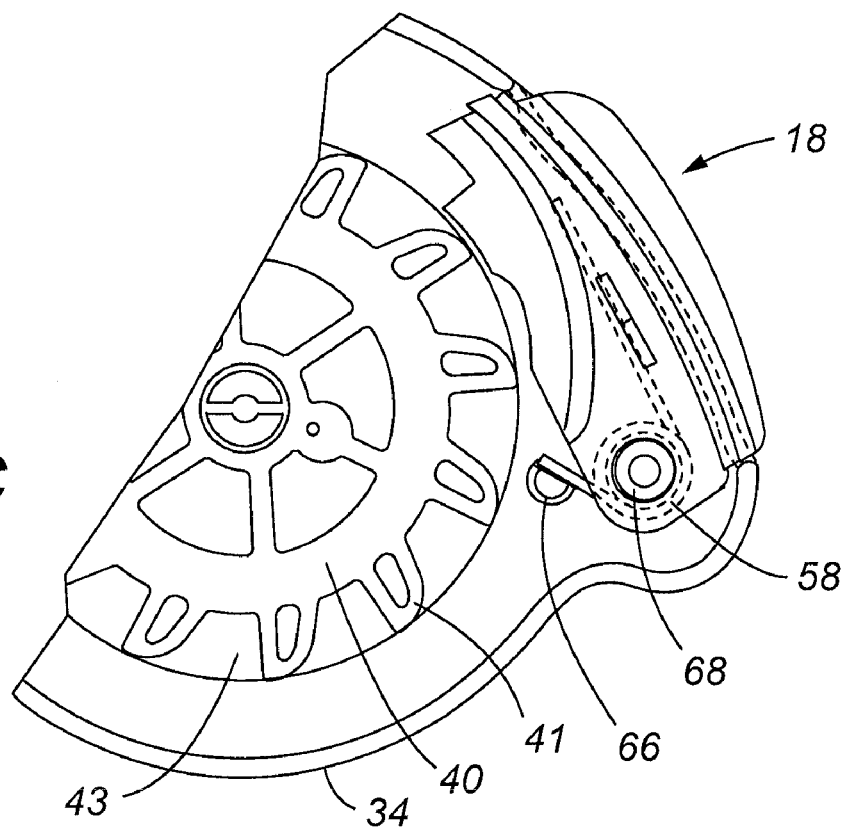
FIG. 5C is a partial sectional view of the leash assembly of FIG. 5A in a partially assembled configuration.

Referring now to FIGS. 5A-5C, various views of the leash assembly are shown with the spool 40, the locking assembly 18 and the second biasing member 58 described above. As shown in FIG. 5A, the leash assembly casing 34 provides a recess for mounting the spool 40 and thereby the leash 8. The casing 34 is also comprised of a post 35 for mounting the spool 40. Referring to FIGS. 5B and 5C and according to a preferred embodiment, the locking assembly 18 is also secured partially within the casing of the leash assembly by a second post 68, and the biasing member 58 of the locking assembly 18 also secured by the second post 68 and biased against a third post 66. As shown in FIGS. 4 and 5A-5C, the third post 66 preferably is cylindrical about a substantial portion of its length, but also has at least one planar surface for engaging a portion of the second biasing member 58. The arrangement allows the spool 40, the leash 8, the locking assembly 18 and the other components described above to operate without interference relative to one another, and provides a means for locking the spool 40 and leash 8 as described in greater detail below.

FIG. 5B also shows the locking assembly 18 according to one embodiment, whereby the locking assembly 18 comprises a tab or tooth 55 about one component 54 that engages a slot 59 on a complementary component 56, which once engaged (by depressing the latching member 52 of locking assembly 18) causes the tooth 55 to flex as it engages slot 59 and creates an audible sound, which may be heard by the user and by the animal. This audible sound is useful in teaching the animal when to stop, due to the sound being associated with and immediately preceding the braking of the leash. According to a preferred embodiment, the locking assembly 18 eliminates a significant number of components used by prior art leashes, including those described in the Summary.

Referring again to FIG. 5C, the spool 40, the locking assembly 18 and casing 34 are shown in a partial sectional view once assembled. The interplay between the spool 40 and the locking assembly 18 is described in greater detail in relation to FIGS. 7-9 below, however, for simplification, the locking assembly 18 is shown here in an assembled state in a first position (unlocked position) such that the locking assembly 18 is not engaging the spool 40 in any way so as to interfere with the free movement of the spool 40 and thereby retraction of the leash 8 while the leash assembly is in use. Furthermore, FIG. 5C shows the relationship between the biasing member 58 and the locking assembly 18, whereby one leg of the biasing member 58 is engaged with the third post 66, the coil of the biasing member 58 is engaged with the second post 68, and the second leg of the biasing member 58 is engaged with the locking assembly 18. In this manner, and according to a preferred embodiment, the biasing member 58 is oriented to bias the locking assembly 18 away from the spool 40 and in a first position (unlocked position) as shown in FIG. 5C.

Figure 6:
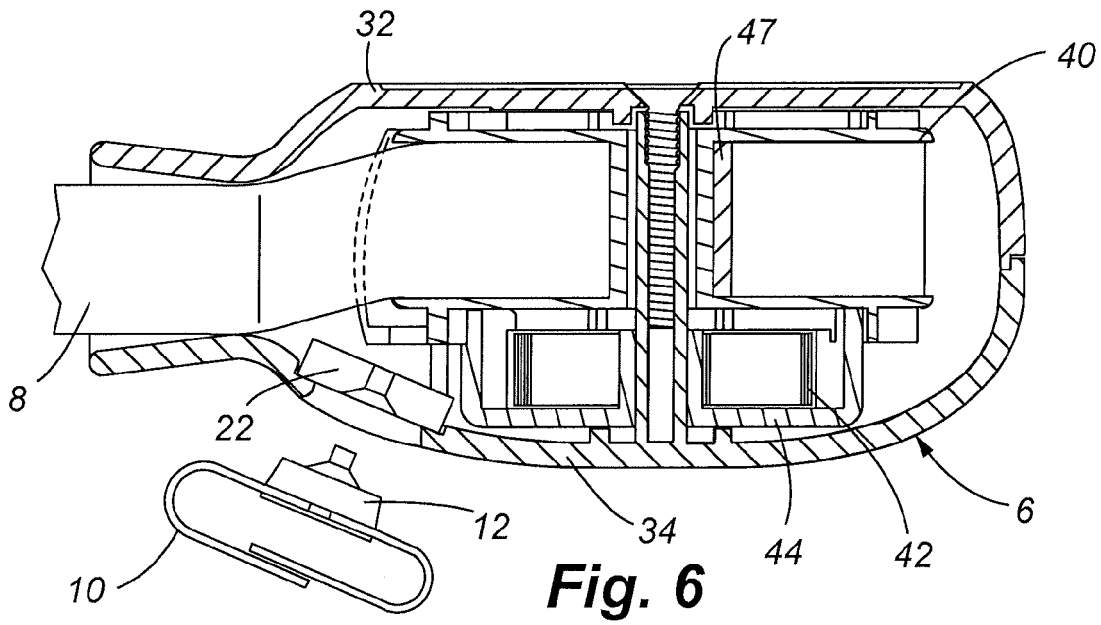
FIG. 6 is a sectional view taken about axis A as shown according to the embodiment of FIG. 3.

Referring now in detail to FIG. 6, a sectional view of the leash assembly 2, spool 40 and attachment means 10 are shown. According to this embodiment, the attachment means 10 may be comprised of a variety of different materials, including by way of example but not limitation, nylon, polyester, leather, mesh, or any other material suitable for retaining an engaging member 12. The attachment means 10 is preferably secured to a collar or harness by providing a closable loop, such as by providing a hook and loop (i.e., a Velcro connection), snap fitting, clasp fitting, magnetic connection, etc. According to a preferred embodiment, the spool 40 further comprises at least one transverse edge 47 which extends from the inner diameter of spool 40 as shown in FIG. 6, for avoiding non-uniform winding of the leash 8. For example, once the leash 8 is initially secured to the spool 40 (such as by a pin as shown in FIG. 4), the starting position of the leash 8 material placed on the inner diameter of the spool 40 will cause the winding of the leash 8 to distort as it wraps around the spool 40 each consecutive turn, thereby causing the leash 8 to wind in a non-uniform manner. By providing edge 47, the initial leash 8 material may be placed immediately adjacent the edge 47, so that the winding continues smoothly over the edge 47 and the previously wound leash 8 material without causing an undesired result.

One aspect of the present disclosure is to provide a full service leash, as opposed to a simple emergency lead, which provides a sufficient length of leash for walking an animal such as a dog, and in particular large breeds of dogs, such as Labradors, Golden Retrievers, and other dog breeds which may exceed 90 lbs in total weight. In this regard, it is also one aspect of the present disclosure to provide a leash assembly which may be easily secured to the collar in not one but two locations, with the second location being selectively engagable/disengagable by the user, but provided in the same or similar lightweight form factor of an emergency lead.

According to varying embodiments disclosed herein, the leash assembly is significantly lighter in weight then other prior art leashes, including those that may be carried by the animal. In one embodiment, the leash assembly, including the handle, leash, buckle, and all components within the casing weigh about 75 g to 140 g. According to a more preferred embodiment, the weight range for the leash assembly is about 80 g to about 125 g. According to a most preferred embodiment, the leash assembly weighs about 82 g. The weight of the leash assembly may vary according to the size or breed of animal to be used with the leash assembly, the amount of leash to be stored within the casing, the presence or absence of the braking assembly, etc.

One advantage of the present invention is to provide a leash assembly that has an overall weight on the same scale as (or even lighter than) prior art emergency leads, but with improved grasping ability, ergonomic design, and which permits a user to safely and securely hold the handle of the leash assembly when the leash assembly is in use, but quickly and securely attach the handle of the leash assembly to the collar or harness of the animal when the leash assembly is not in use. Thus, one advantage is provided in the lightweight leash assembly having an ergonomic handle, which may be safely grasped in the single hand of a user, and operated either when the leash assembly is in use, or when the user is attaching the leash assembly (with a single hand) to the collar or harness, or alternatively detaching the handle (with a single hand) from the collar or harness. The leash assembly includes added features, such as about a 6 foot leash and a braking means that are not typically found with prior art emergency leads, but without sacrificing the overall weight. In addition, the leash assembly further enhances the comfort to the user and the animal, due to the ergonomic design of the handle, the size and shape of the handle, the elastic member, etc. Further details regarding the ergonomic design of the handle and the improvement in comfort to the user and the animal are described below in relation to FIGS. 12A and 12B.

According to varying embodiments, reduced weight of the leash assembly is accomplished in a number of ways. First, the material used for the handle of the leash assembly, according to a preferred embodiment, consists of a polycarbonate-ABS blend, which is a lightweight material, having material properties required of the leash assembly (i.e., the material is sufficiently strong to prevent breaking, cracking, warping, distortion or other abuse, such as from the continual pulling of the leash by the animal, the grip on the handle of the leash assembly by the user, etc.). Second, the components of the leash assembly, including the casing 32, 34, the spool 40, the brake assembly 18 and the biasing member housing 44 are all cored during the manufacturing process. For example, the spool 40 comprises a plurality of teeth 41, which are not solid, but rather are hollowed out to reduce the overall weight of the spool 40. Similarly, other parts of the leash assembly are preferably cored or milled to remove unnecessary material weight.

Third, the leash assembly comprises a minimum amount of non-plastic components. For example, according to a preferred embodiment, there are only five components on the handle that are comprised of a metal or metal alloy, as reflected in FIG. 4. These metal components are designed to minimize the size and weight of each component, thereby further reducing the overall weight of the leash assembly. By way of example but not limitation, the biasing member 42 according to a preferred embodiment is preferably in the range of 181 to 196 centimeters in length, which is smaller than biasing members found in typical retractable leashes. Fourth, design of the handle 6 is comprised of compound contours and radii, which not only improve the ergonomic design of the handle 6, but also greatly reduce the material weight of the casing 32, 34 of the handle 6.

For example, the leash assembly 2 according to a preferred embodiment has over 3,500 distinct surfaces, due in part to the compound contours and unique radii present in the design of the handle 6, the coring and milling of various surfaces within the casing 32, 34, and the reduced thickness of the casing 32, 34, which is achieved in part by presence of compound contours. These manufacturing steps permit the leash assembly to be greatly reduced in overall weight compared to typical prior art leashes and emergency leads, which typically are formed from a planar sheet of synthetic material, and then heated and bent to achieve simple radius present in the typical prior art leashes or leads. The process of bending the planar sheet requires the material to be thicker than the casing 32, 34 in a preferred embodiment of the present disclosure.

The increased size of the handle 6 (relative to typical emergency leads) permits the leash assembly to have significant improvements over prior art leashes and leads within this weight range, but without sacrificing the comfort, use, and efficiency of the leash assembly. These improvements provide numerous distinct advantages over the prior art leashes and leads. For example, the increased size of the handle 6 permits a larger spool to be housed within the casing 32, 34, which in turn permits a longer length of leash 8 to be housed within the handle 6. According to varying embodiments, the leash 8 stored within the handle 6 may be 2-3 times longer in length than typical prior art emergency leads, which typically have about 20-30 inches of leash, Other wearable leashes (other than emergency leads) typically have only 4 feet or less of leash. These shorter leashes greatly affect the performance of the leash assembly, due in part to the fact that the animal restrained by the leash assembly must remain constantly by the user, or in a heeled position, as opposed to being able to roam freely as the animal is more accustomed to. Thus, by offering a leash in the range of 6 feet, while at the same time reducing the overall weight of the leash, the walking experience can be improved for both the user and the animal.

Referring again to the drawing figures, varying embodiments disclosed herein further comprise means for connecting the leash assembly to the collar by attachment means that securely hold the handle of the leash assembly to the collar of the animal, but which do not interfere with removal of the handle from the collar when the user needs to control the animal with the leash. In this regard, the leash assembly of the present disclosure eliminates the presence of cumbersome buckles, clips, snaps, or other permanent fastening features that prohibit the user from quickly removing the handle and taking control of the animal via the leash assembly. Accordingly, it is one advantage of the present disclosure to provide attachment means for the leash assembly such that the leash assembly is adequately secured to the collar when not in use, but which may be removed quickly by a user should the user need to use the leash and immediately restrain the animal.

In a preferred embodiment, the attachment means 10 further comprises at least one engaging member 12, which is affixed to the attachment means 10 and is operatively associated with a receiving member 22 secured within the casing 34 of the leash assembly. Thus, when engaged, the engaging member 12 and the receiving member 22 have complimentary surfaces such that they may become integrated with the other, such as in a male/female configuration. These complimentary surfaces improve the attachment between the attachment means 10 and the handle 6. According to one preferred embodiment, at least the receiving member 22 is comprised of a neodymium magnet, a type of rare earth magnet of significantly greater reminisce than other types of magnets, which further improves the strength of the connection between the engaging and receiving members 12, 22. Furthermore, the neodymium magnets according to this embodiment are also more resistant to becoming demagnetized and operate more efficiently at high temperatures. Although neodymium magnets are described herein, it is expressly understood that other types of magnets, including other rare earth magnets (alnico and ferrite magnets, for example) may also be used without departing from the operative formation of the engaging and receiving members 12, 22 described herein. Skilled artisans will also understand that other attachment members may be utilized without departing from the spirit of the invention.

Figure 7:
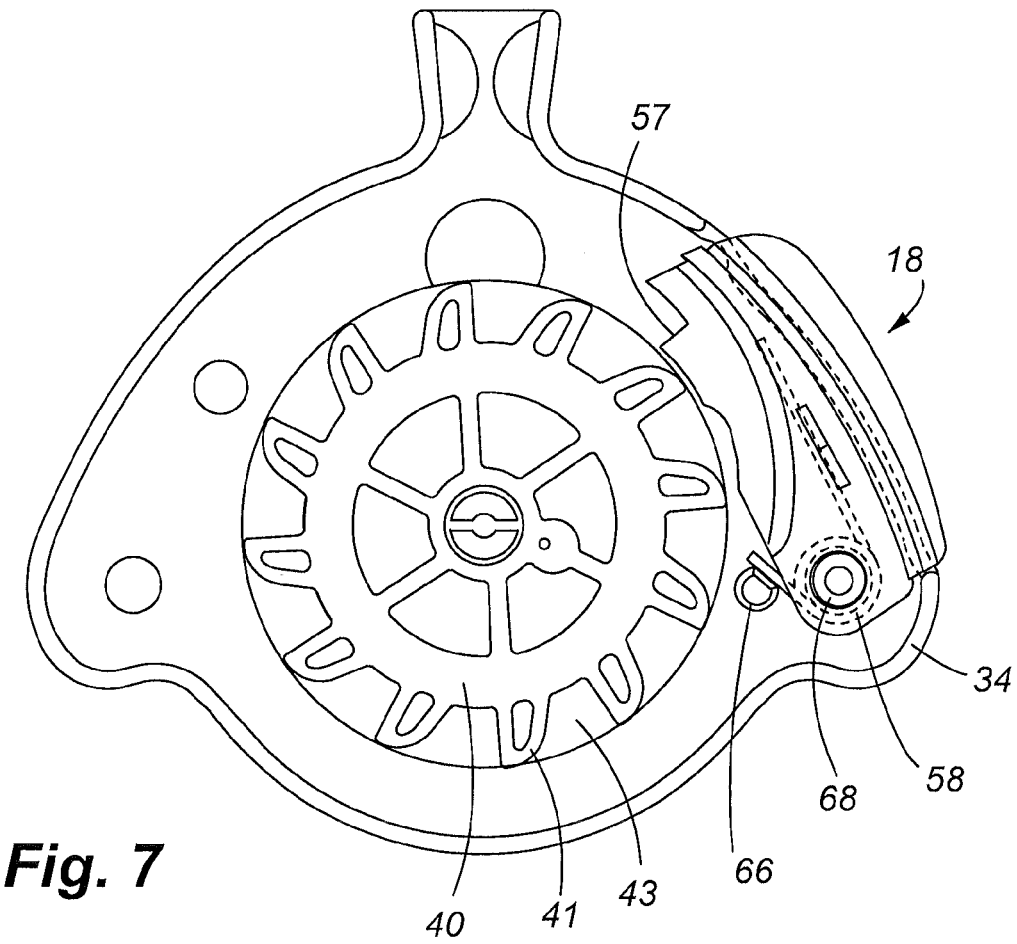
FIG. 7 is a sectional view of the leash assembly according to the embodiment of FIG. 1.
Figure 8:
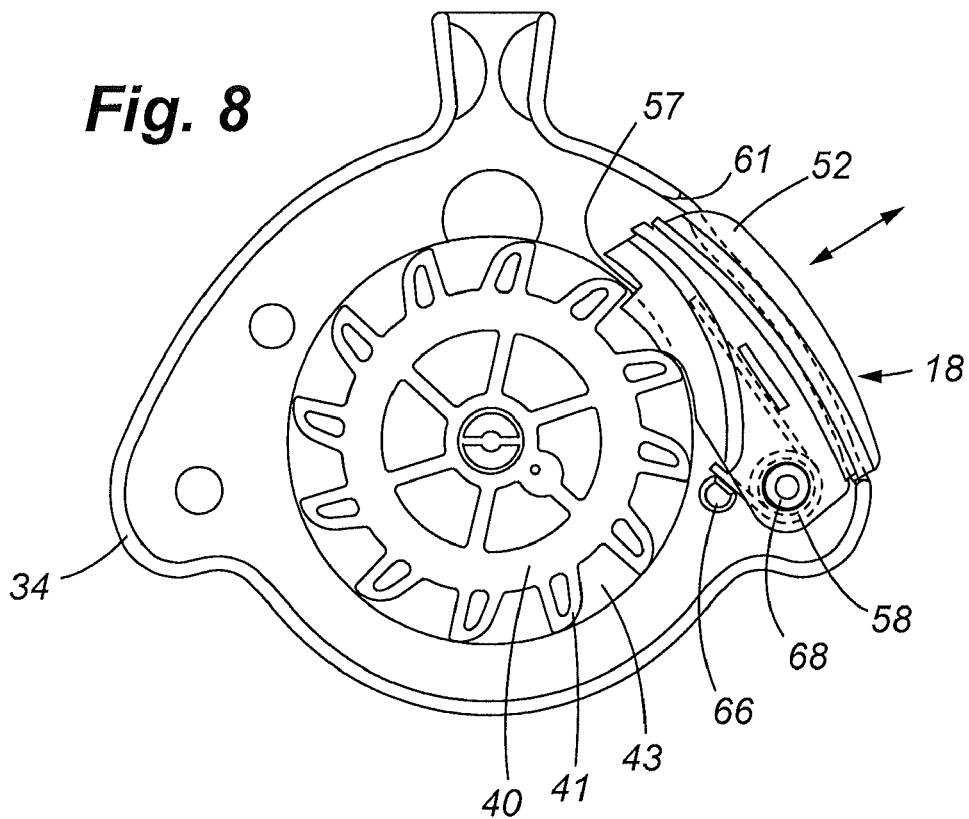
FIG. 8 is another sectional view of the leash assembly according to the embodiment of FIG. 1.
Figure 9:
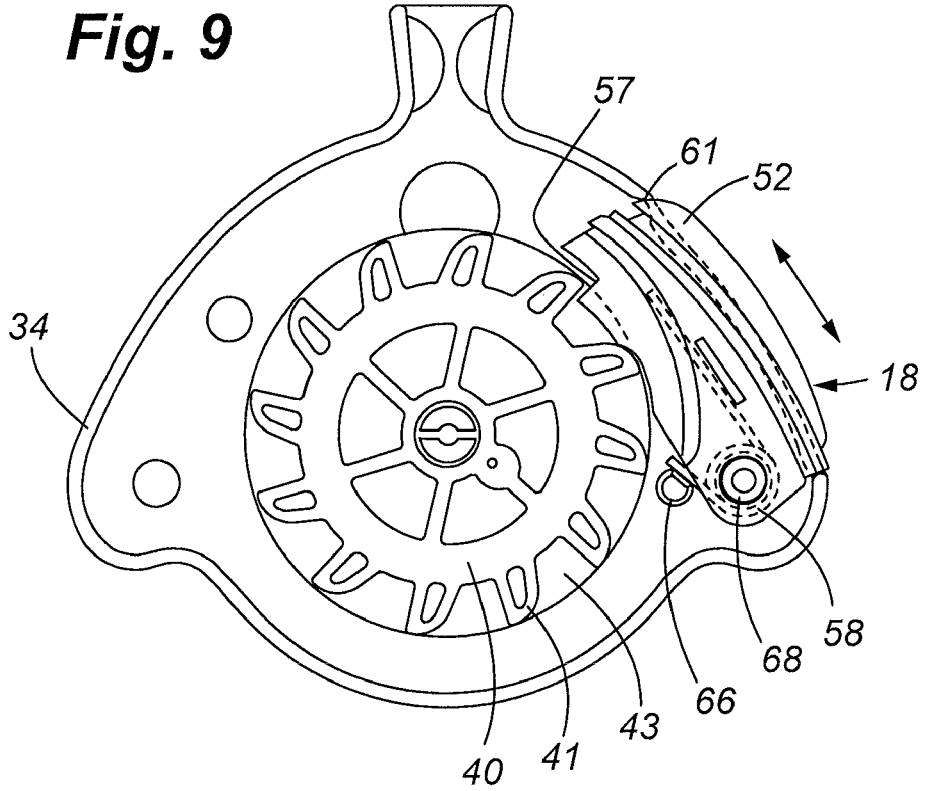
FIG. 9 is another sectional view of the leash assembly according to the embodiment of FIG. 1.

Referring now in detail to FIG. 7-9, the locking assembly 18 according to a preferred embodiment is described. In FIG. 7, the locking assembly 18 is shown in a first or unlocked position, with the locking assembly 18 disengaged from the spool 40 such that the spool 40 may rotate freely and the leash 8 may become retracted without interference from the locking assembly 18. Referring to FIG. 8, the locking assembly 18 is shown in a second or locked position in which the locking assembly 18 has been moved so that a tab 57 extending from the locking assembly 18 engages one of a plurality of teeth 41 extending from the inner circumference of the spool 40, thereby preventing further rotation of the spool 40. The plurality of teeth 41 form a plurality of recesses 43 there between for permitting the tab 57 to enter one of the recesses 43 in the position shown in FIGS. 8 and 9.

In the configuration shown in FIG. 8, the locking assembly 18 temporarily engages the spool 40 while a user's thumb, finger or hand is pressing downwardly on the locking assembly 18, thereby stopping the movement of the spool 40 and leash 8 and thereby restraining the animal. To permit the animal to move and the leash 8 to retract further, the user simply needs to release the pressure on the locking assembly 18, and the second biasing member 58 will cause the locking assembly to move away from the spool 40, thereby removing the tab 57 of the locking assembly 18 from engagement with one of the plurality of teeth 41 of the spool 40.

As shown in FIG. 9, the locking assembly 18 is shown in a third position (secured locking position) wherein the position of the locking assembly of FIG. 8 is now in a permanently locked position. According to this embodiment, the locking assembly 18 is comprised of a latching member 52, which moves laterally as shown in relation to FIG. 9 such that it selectively engages the casing 34 of the leash assembly 2 and secures or "locks" the locking assembly 18 in this third position. Thus, in operation, once the user has depressed the locking assembly 18 and engaged the tab 57 of the locking assembly 18 with one of the plurality of teeth 41, the user then may position the latching member 52 in a forward position by sliding the latching member in the direction indicated in FIG. 9, thereby securing the locking assembly 18 in the locked position. In this manner, the user may also remove their hand or finger from the locking assembly 18 and the latching member 52, but the locking assembly 18 will remain in a second locking position, engaged against the casing 34, and thereby prevent the locking assembly 18 from becoming biased away from the locked position.

In use, the braking mechanism permits a user to operate the leash while walking a dog or other companion pet without restricting the movement of the leash relative to the spool and the handle of the leash assembly. Thus, as the dog or other companion pet moves relative to the user, when the braking mechanism is in its first position, the animal is relatively free to do so (with the only restriction being the overall length of the leash included within the assembly). When the user desires to stop the movement of the animal, such as when coming to a street corner or encountering another animal during the walk, the user can immediately depress the braking mechanism and stop the rotation of the spool and thereby the retraction of the leash from the handle of the leash assembly. As long as the user is depressing the locking assembly, the leash will not be able to rotate, and the animal will be restrained. Once the user desires to walk (and allow the animal to walk) the user simply releases pressure on the latching member, and the locking assembly disengages the spool and permits the spool to rotate again, thereby permitting the leash to further retract and the animal to move freely again. However, if the user desires to permanently restrain the animal using the locking assembly, the user first depresses the latching member, and then slides the latching member forward into its permanently secured position, thereby preventing the leash from retracting and the spool from rotating, even if the user's finger or thumb becomes disengaged from the latching member. Thus, in operation, the locking assembly provides three positions which permit the user to selectively allow the animal to roam freely, to temporarily restrain the animal, and to permanently restrain the animal. This three position locking assembly is achieved without departing from the ergonomic and other aspects of the invention described herein.

Figure 10:
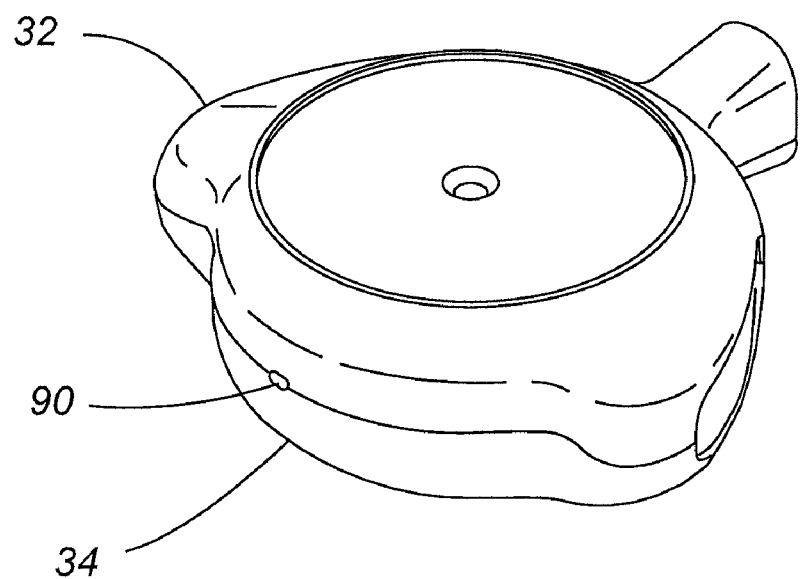
FIG. 10 is a perspective view of the casing of the leash assembly according to another embodiment.

Referring now to FIG. 10, according to one embodiment the casing and leash assembly further comprises at least one drain hole 90 for permitting liquid, sand, dirt, or small debris to be removed from the casing. The drain hole 90 is formed preferably from two small indentations along the periphery of casing 32, 34, and congruent to one another so that when the casing 32, 34 is fully assembled a circular or elliptical shaped opening is formed thereby. The drain hole 90 may be large enough to permit small particles of sand, dirt or other debris to pass through the drain hole 90, and is also adequately sized to permit water to drain from the drain hole, should the animal enter a lake, pond, river, pool or other body of water. In one preferred embodiment, the drain hole 90 is located on a side of the leash assembly such that the drain hole 90 is oriented towards the ground when the handle is attached to the attachment member, so that gravity will cause any water to drain through the drain hole 90. Additional drain holes may also be added to the device.

Figure 11:
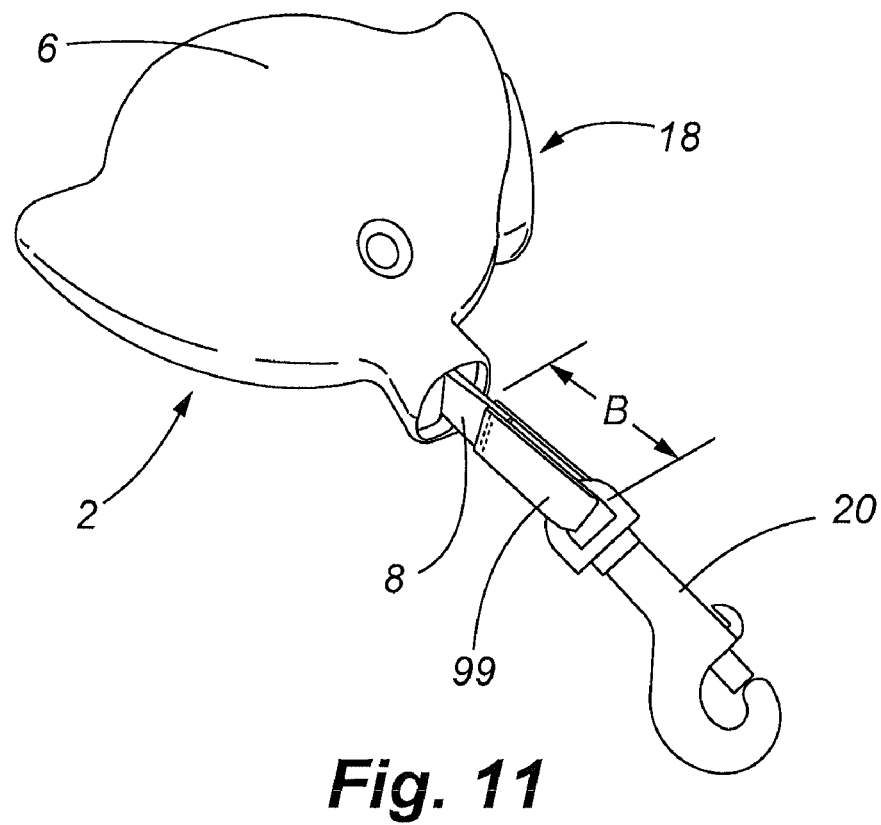
FIG. 11 is a perspective view of the leash of the leash assembly according to yet another embodiment.

Referring now to FIG. 11, according to another embodiment, the leash of the leash assembly may further comprise an elastic member 99 at one distal end of the leash 8 and between the leash 8 and the buckle 20 for eliminating the abruptness of braking the leash or when the leash is fully retracted from the spool. The elastic member 99 is preferably made from a stretchable material, such as elastic or semi-elastic material, which permits the elastic member 99 to extend the overall length of the leash 8, once the leash is stopped or reaches its fully retracted position relative to the spool. Thus, while the elastic member 99 is comprised of a loop of material having a net length in an un-stretched position of B (as shown in FIG. 11), once the leash 8 reaches its fully retracted position or a hard brake is applied, the elastic member 99 is stretchable to a length>B, thereby extending the net length of the leash 8 and elastic member 99. Furthermore, due to the stretchable nature and the inherent properties of the material (i.e., elasticity), the final stop of the leash 8 according to this embodiment is reached more gradually than without the elastic member 99.

For example, the tension of the elastic member 99 is less once the elastic member is first stretched to a position>B, but increases as the stretching of elastic member continues, ultimately reaching its final, fully stretched position. This results in a more comfortable walking experience for the user when the leash assembly is in use.

The incorporation of the elastic member 99 not only improves the comfort and ease of braking of the leash, but is also an important safety feature. This is because by eliminating the immediate and often jarring braking associated with prior art leashes, the user is less likely to have the handle 6 of the leash assembly 2 pulled unexpectedly from the user's hand. This eliminates situations where the user needs to immediately stop the leash and restrain the animal, such as at a street crossing, but loses control of the leash due to the momentum of the animal, the force on the leash, the lack of a secure grip on the handle, etc.

The elastic member 99 also makes use of the leash assembly 2 more comfortable even when walking the animal with the leash 8 in the locked position. For example, increasing the length of the elastic member 99 by about 2 to 6 inches on the end of the leash makes the braking or stopping of the leash 8 more comfortable and eliminates the sudden jarring associated with a typical nylon or leather leash. In one embodiment, the length B of elastic member 99 is about 0.25 inches to 6 inches. In a preferred embodiment, the length B is about 1 inch. The length of the elastic member 99 and the length of leash 8 described herein may, according to varying embodiments, be different combinations of lengths without departing from the novel aspects of the invention.

Referring now in detail to FIGS. 12A and 12B, the leash assembly according to a preferred embodiment is shown in the hand of a user (FIG. 12A), as is an emergency lead, such as known in the prior art (FIG. 12B). Referring in detail to FIG. 12A, the leash assembly 2 has a ergonomic design, which permits a user to firmly grasp the leash assembly 2 in a single hand, while wrapping fingers around the body of the handle 6 of the leash assembly 2. The handle of the leash assembly 2 is symmetrical about the vertical axis (of FIG. 12A) such that a user can hold the handle 6 in either a right hand or a left hand without sacrificing comfort or functionality. More specifically, the leash assembly 2 has a handle 6 which comprises two arcuate surfaces 16, 17, which are shaped to receive the web between the thumb and the index finger of a user when the handle 6 is grasped by the user, regardless of whether the user is right handed or a left handed (i.e., the arcuate surfaces 16, 17 are in the same position whether the handle 6 of the leash assembly 2 is placed in the palm of a left hand or a right hand of a user). The user may also operate the brake assembly 18 using the thumb of a user, when the handle 6 is held in either the left hand or the right hand of a user. Thus, while one of the arcuate surfaces 16, 17 of the handle 6 is pressed into the web of a user's hand, the thumb of the user (whether the right or the left) may easily reach and engage the brake assembly 18, and operate the brake assembly 18 as described in connection with FIGS. 7-9 above. The handle 6 of the leash assembly 2 is large enough so that it may be safely grasped by a user, and may accommodate multiple fingers of a user to prevent inadvertent slipping or dropping of the handle when the leash assembly 2 is in use.

In comparison, the prior art emergency lead 200 shown in FIG. 12B is significantly more difficult to engage all four fingers of a user. This is due in part to the size of the prior art lead 200, the simple contour and generally planar surface 210 of the lead, and the lack of ergonomic design of the prior art lead 200. Thus, it is not uncommon for a prior art lead 200, such as the one shown in FIG. 12B, to slip or become completely pulled from the hand of user while in use. The prior art lead 200 also has external component 220, which is required for attaching the lead 200 to the collar of an animal, but which extends outside the planar surface 210 of the lead 200, thereby extending into the palm of the user and causing discomfort when in use. By comparison, the design of the handle 6 of the leash assembly 2, according to varying embodiments described herein, does not have any external components or protrusions which would interfere with the grasping of the handle 6 and operation of the leash assembly 2. Prior art emergency leads, such as the one shown in FIG. 12B, typically cannot be secured to the collar or harness of an animal by a single hand, due to problems such as the presence and position of external mechanisms 220, the type of attachment between external mechanisms 220 and the collar or harness of the animal, the relatively small size of the prior art emergency lead 220, etc. Thus, the leash assembly 2 according to varying embodiments provide a more functional, comfortable leash without increasing the size or weight unnecessarily.

To provide further clarity to this Detailed Description and to the drawing figures appended hereto, the following list of components and associated reference numbers are provided as follows:

| Component | Reference No. |
| --- | --- |
| Leash Assembly | 2 |
| Collar | 4 |
| Handle | 6 |
| Leash | 8 |
| Attachment Members | 10 |
| Engaging Member | 12 |
| Ring or Loop | 14 |
| Arcuate Surfaces | 16, 17 |
| Locking Assembly | 18 |
| Buckle | 20 |
| Receiving Member | 22 |
| Cover | 23 |
| Display | 24 |
| Surface | 25 |
| Casing | 32, 34 |
| Post | 35 |
| Aperture | 36 |
| Spool | 40 |
| Teeth | 41 |
| Biasing Member | 42 |
| Biasing Member Housing | 44 |
| Fastening Member | 46 |
| Edge | 47 |
| Components (of Locking Assembly) | 52, 54, 56 |
| Latching Member | 52 |
| Tooth (of Component 54) | 55 |
| Tab (of Component 56) | 57 |
| Second Biasing Member | 58 |
| Slot (of Component 56) | 59 |
| Clips | 63, 65 |
| Third Post | 66 |
| Second Post | 68 |
| Drain Hole | 90 |
| Elastic Member | 99 |
| Axis | A |
| Prior Art Lead | 200 |
| Planar Surface (of Lead) | 210 |
| External Member (of Lead) | 220 |
| Length (of Elastic Member) | B |

The foregoing description of the present disclosure has been presented for illustration and description purposes. However, the description is not intended to limit the invention to only the forms disclosed herein. In the foregoing Detailed Description for example, various features are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Consequently, variations and modifications commensurate with the above teachings and skill and knowledge of the relevant art are within the scope of the present invention. The embodiments described herein above are further intended to explain best modes of practicing the invention and to enable others skilled in the art to utilize the invention in such a manner, or include other embodiments with various modifications as required by the particular application(s) or use(s) of the present invention. Thus, it is intended that the claims be construed to include alternative embodiments to the extent permitted by the prior art.

What is claimed is:

1. A leash assembly, comprising:
a leash, which is operatively associated with a rotational spool, and further comprising a buckle affixed to one distal end of the leash;
a handle for retractably storing the leash and the rotational spool, the handle further comprising a receiving member;
an attachment member that is secured to a collar worn by an animal, the attachment member comprising an engaging member for engaging the receiving member;
the engaging member and receiving member having shapes that are complementary such that the engaging member may be selectively inserted into and received by and retained by the receiving member;
wherein the buckle may be selectively engaged to the collar forming a first connection between the leash assembly and the collar, and wherein the engaging member may be selectively engaged with the receiving member, forming a second connection between the leash assembly and the collar, and wherein the leash assembly may be selectively removed from the collar by disengaging the engaging member from the receiving member without disconnecting the buckle from the collar;
wherein the spool is further comprised of a plurality of teeth along the circumference of the spool, wherein the leash assembly further comprises a latching member extending outside the handle and having a first position and a second position, wherein the latching member is coupled with a braking member configured to engage one of the plurality of teeth when the latching member is in the second position, wherein the spool is not free to rotate when the braking member engages one of the plurality of teeth thereby preventing the leash from retracting from the handle, and wherein when the latching member is in the first position, the braking member disengages the one of the plurality of teeth thereby permitting the leash from retracting from the handle.

2. The leash assembly according to claim 1 wherein the latching member, once depressed in its second position, may slide laterally to a third position at least partially engaging the handle such that the latching member may not be returned to its first position without first returning the latching member to its second position.

3. The leash assembly according to claim 2 wherein the leash assembly weighs less than about 125 grams.

4. The leash assembly according to claim 2 wherein the leash assembly weighs less than about 100 grams.

5. The leash assembly according to claim 2 wherein the leash assembly weighs less than about 85 grams.

6. The leash assembly according to claim 3 wherein the leash assembly further comprises a display for displaying at least one indicia relating to the identity of the animal or the animal's owner.

7. The leash assembly according to claim 2 wherein the receiving member is comprised of a neodymium magnet.

8. The leash assembly according to claim 2 wherein the leash assembly is made of a material consisting of a polycarbonate-ABS blend.

9. The leash assembly according to claim 2 wherein the handle of the leash assembly further comprises at least one aperture thereon for permitting water collected within the handle to drain from the handle.

10. The leash assembly according to claim 2 wherein the length of the leash is at least about six linear feet.

11. The leash assembly according to claim 2 wherein the leash includes at least one section made of elastomeric material.

12. A restraining device for use with an animal, comprising:
a leash which is coupled at one distal end to a buckle;
a casing for housing the leash about a rotational spool, and comprising at least one magnetic receiving member;
a braking member that is at least partially enclosed within the casing and which is operatively associated with a plurality of surfaces of the rotational spool;
an attachment member that may be secured to a collar or harness worn by an animal, the attachment member comprising a magnetic engaging member of opposite polarity as the magnetic receiving member;
the magnetic engaging member and magnetic receiving member having shapes that are complementary such that the engaging member may be selectively inserted into and received by and retained by the receiving member;
wherein the buckle may be selectively engaged to the collar or harness, thereby forming a first connection between the leash assembly and the collar, and wherein the magnetic engaging member may be selectively engaged with the magnetic receiving member, thereby forming a second connection between the leash assembly and the collar;
wherein the braking member is configured to engage one of the plurality of surfaces of the spool such that, while engaged with the braking member, the spool is prevented from rotating and the leash is prevented from further retracting from the handle;
wherein the leash is equal to or greater than about 6 feet in length; and
wherein the restraining device in its entirety weighs less than about 120 grams.

13. The restraining device according to claim 12 further comprising a display for displaying at least one indicia relating to the identity of the animal or the animal's owner.

14. The restraining device according to claim 12 wherein the casing is made of a material consisting of a polycarbonate-ABS blend.

15. The restraining device according to claim 14 wherein the casing, the rotational spool and the brake member are cored to reduce the overall weight of the restraining device.

16. The restraining device according to claim 14 wherein the casing further comprises a plurality of compound contours to reduce the overall weight of the restraining device and the ergonomic design of the restraining device.

17. The restraining device according to claim 12 wherein the magnetic receiving member is comprised of a neodymium magnet.

18. The restraining device according to claim 12 wherein the leash comprises at least one section of elastic or semi-elastic material for permitting the length of the leash to vary in length.

19. The restraining device according to claim 18 wherein the at least one section of elastic or semi-elastic material is about 0.25 to 6 inches in length.

20. A retractable leash, comprising:
a handle configured to be placed in the hand of a user or selectively worn by an animal;
a spool mounted to a spindle located within the handle for receiving a leash;
a buckle secured to the retractable leash for connecting the leash to a collar worn by an animal;
a magnetic receiving member located on or within the handle for receiving a magnetic engaging member having an opposite magnetic polarity as the magnetic receiving member;
an attachment member that is secured to a collar worn by an animal, the attachment member comprising a magnetic engaging member for engaging the magnetic receiving member;
the magnetic engaging member comprising a post and the magnetic receiving member comprising an opening corresponding to the shape of the post such that the engaging member may be selectively inserted into and received by and retained by the receiving member;
wherein the spool further comprises a biasing member that biases the spool to rotate in a manner to retract the leash within the handle when the leash is not in use;
wherein the buckle may be connected to the collar in a first connection, and wherein the magnetic engaging member may be connected to the magnetic receiving member in a second connection such that the leash assembly may be selectively disconnected from the collar by disengaging the magnetic engaging member from the magnetic receiving member without disconnecting the buckle from the collar;
wherein the spool is further comprised of a plurality of teeth along the circumference of the spool, wherein the leash assembly further comprises a latching member extending outside the handle and having a first position and a second position, wherein the latching member is coupled with a braking member configured to engage one of the plurality of teeth when the latching member is in the second position, wherein the spool is not free to rotate when the braking member engages one of the plurality of teeth thereby preventing the leash from retracting from the handle, and wherein when the latching member is in the first position, the braking member disengages the one of the plurality of teeth thereby permitting the leash from retracting from the handle, and wherein the latching member, once depressed in its second position, may slide laterally to a third position at least partially engaging the handle such that the latching member may not be returned to its first position without first returning the latching member to its second position.

21. The retractable leash according to claim 20 wherein the retractable leash weighs less than about 125 grams.

22. The retractable leash according to claim 20 wherein the retractable leash weighs less than about 100 grams.

23. The retractable leash according to claim 20 wherein the retractable leash weighs less than about 85 grams.

24. The retractable leash according to claim 20 wherein the handle further comprises a display for displaying at least one indicia relating to the identity of the animal or the animal's owner.

25. The retractable leash according to claim 20 wherein the handle of the retractable leash assembly is made of a material consisting of a polycarbonate-ABS blend.

26. The retractable leash according to claim 20 wherein the retractable leash is configured to store about 6 linear feet of leash about the spool, and wherein the leash assembly weighs about 82 grams.

27. The retractable leash according to claim 26 wherein the magnetic receiving member is comprised of a neodymium magnet.

28. The retractable leash according to claim 20 wherein the retractable leash further comprises at least one section of elastic or semi-elastic material for permitting the length of leash to vary in length when the leash is in a restrained or fully extended position.

29. The retractable leash according to claim 28 wherein the at least one section of elastic or semi-elastic material is about 0.25 to 6 inches in length.

* * * * *